United States Patent
Mallet et al.

(10) Patent No.: US 7,987,705 B2
(45) Date of Patent: Aug. 2, 2011

(54) METHOD FOR ESTIMATING A TIRE PERFORMANCE DURING A BRAKING SITUATION

(75) Inventors: Eric Mallet, Pessat-Villeneuve (FR); Jérémy Buisson, Saint Satumin (FR)

(73) Assignees: Michelin Recherche et Technique S.A., Granges-Paccot (CH); Societe de Technologie Michelin, Clermont-Ferrand (FR)

( * ) Notice: Subject to any disclaimer, the term of this patent is extended or adjusted under 35 U.S.C. 154(b) by 39 days.

(21) Appl. No.: 12/664,233

(22) PCT Filed: Jun. 2, 2008

(86) PCT No.: PCT/FR2008/000745
§ 371 (c)(1),
(2), (4) Date: Dec. 11, 2009

(87) PCT Pub. No.: WO2009/004173
PCT Pub. Date: Jan. 8, 2009

(65) Prior Publication Data
US 2010/0217571 A1    Aug. 26, 2010

(30) Foreign Application Priority Data
Jun. 11, 2007  (FR) .................................. 07 04152

(51) Int. Cl.
*G01M 17/02*    (2006.01)

(52) U.S. Cl. ............................................. 73/146; 701/22
(58) Field of Classification Search ........................ None
See application file for complete search history.

(56) References Cited

U.S. PATENT DOCUMENTS

| | | | | |
|---|---|---|---|---|
| 7,069,135 | B2* | 6/2006 | Bertrand | 701/80 |
| 7,099,765 | B2* | 8/2006 | Bertrand | 701/73 |
| 2004/0007046 | A1 | 1/2004 | Karrer et al. | |
| 2005/0065698 | A1* | 3/2005 | Bertrand | 701/80 |
| 2005/0065699 | A1* | 3/2005 | Bertrand | 701/80 |
| 2008/0294352 | A1* | 11/2008 | Spetler | 702/33 |
| 2010/0324766 | A1* | 12/2010 | Linda et al. | 701/22 |

FOREIGN PATENT DOCUMENTS

| EP | 0 775 903 | 5/1997 |
|---|---|---|
| EP | 1 637 863 | 3/2006 |

OTHER PUBLICATIONS

K. Hedrick et al., "Real-Time Slip-Based Estimation of Maximum Tire-Road Friction Coefficient", IEEE/ASME Transactions on Mechatronics, IEEE Service Center, vol. 9, No. 2, pp. 454-458, Jun. 2004.

* cited by examiner

*Primary Examiner* — Andre J Allen
(74) *Attorney, Agent, or Firm* — Cohen Pontani Lieberman & Pavane LLP

(57) ABSTRACT

A method for estimating the performance, during a braking situation, of a tire to be provided to a vehicle, this method comprising an experimental phase (EXPERIM) including a step (EVAL_MU) of assessing the grip coefficient (μ) of the tire on the ground. This assessment step is performed for different values (Vi) of the relative displacement speed of the tire axis with regard to the ground and for different values (gi %) of the tire slip rate on the ground. The experimental phase (EXPERIM) further comprises a modelization step (MODEL) of representing the grip coefficient of this tire, as resulting from the assessment step (EVAL_MU), by a function (MU3D) of the relative displacement speed of the tire axis with regard to the ground and of the slip rate of this tire on the ground.

9 Claims, 3 Drawing Sheets

METHOD FOR ESTIMATING A TIRE PERFORMANCE DURING A BRAKING SITUATION

RELATED APPLICATIONS

This is a U.S. National Phase Application under 35 USC §371 of International Application PCT/FR2008/000745 filed on Jun. 2, 2008.

This application claims the priority of French patent application Ser. No. 07/04152 filed Jun. 11, 2007, the entire content of which is hereby incorporated by reference.

FIELD OF THE INVENTION

The present invention generally relates to techniques for providing land vehicles with tires.

More particularly, the invention relates to a method for estimating the performance of a tire to be provided to a vehicle, during a braking situation, this method comprising an experimental phase including at least a step of assessing the grip coefficient of the tire on the ground.

BACKGROUND OF THE INVENTION

A method of this type is described in HEDRICK K et al. paper: "Real-Time Slip-Based Estimation of maximum Tire-Road Friction Coefficient" IEE/ASME TRANSACTIONS ON MECHATRONICS, IEEE SERVICE CENTER, PISCATAWAY, N.J., US, vol. 9, no 2, June 2004 (2004-6), pp 454-458.

A similar method is described in patent document EP 1 637 863.

Although in the past, tire performances during braking have been usually assessed through braking distance tests of a vehicle provided with these tires, today, these performances are more commonly assessed on the basis of measurements of the grip coefficient of a single tire equipping a trailer, these measurements being correlated to measurements of the slip rate of this tire and to indicators derived from these measurements.

Although this technique has the advantage of requiring the use of a tire only, it usually leads to insufficient reliability assessments, and do not guarantee that a plurality of different tires, sorted on an ascending order of performance on the basis of these tests, exhibit, once mounted on a vehicle of the same type, performances that classify them in the same order.

SUMMARY OF THE INVENTION

One object of the invention is to provide a method for estimating a tire performance during a braking situation, which, in spite of its simplicity, is more reliable than the known techniques.

This and other objects are attained in accordance with one aspect of the invention directed to a method that includes the step of assessing the ground-tire grip coefficient is performed for different values of the relative displacement speed of the tire axis with regard to the ground and for different values of the ground-tire slip rate. The experimental phase further comprises a modelization step of representing the grip coefficient of this tire, as resulting from the assessment step, as a function of the relative displacement speed of the tire axis with regard to the ground and of the slip rate of this tire on the ground. This method further comprises a predictive phase including an operation of determining an overall tire performance indicator, of integrating, against the instantaneous relative displacement speed of the axis of the tire and the ground, and against the slip rate of this tire on the road, the tire grip coefficient representative function, over an instantaneous speeds and slip rates domain corresponding to a real or simulated braking sequence.

In one embodiment, the step of assessing the tire grip coefficient comprises the simultaneous operations of rolling the tire on a reference surface equivalent to the ground, applying the tire on the reference surface with a pressing force which intensity is known by adjustment and/or measurement, running the reference surface with regard to the tire axis, at a relative displacement instantaneous speed, known by adjustment and/or measurement, and decreasing from a maximal value to a minimal value, measuring the instantaneous angular rotational speed of the tire, and periodically applying a braking torque on the tire of which value is known by adjustment and/or measurement and which can cause the tire to slip on the reference surface.

Typically, the grip coefficient may be assessed through the ratio of the longitudinal force corresponding to the braking torque to the pressing force.

The operation of periodically applying the braking torque is advantageously controlled so as to vary the tire slip rate with regard to the reference surface between a preferably null minimal value and a maximal value at least equal to 20%.

It is also possible that the operation of periodically applying the braking torque be controlled such that it periodically reaches, or even exceeds, the slip rate value for which the grip value is at its maximum.

In any case, the step of assessing the grip coefficient of the tire may be advantageously performed in a room at a substantially constant temperature.

For example, the modelization step comprises an optimization operation of seeking the values to be allocated to predetermined parameters such that a parametric expression of said function of the relative displacement speed of the tire axis with regard to the ground and of the slip rate of this tire on the ground corresponds at best to the grip coefficient as assessed during the assessment step, for the different values of the relative displacement speed of the tire axis with regard to the ground and for the different values of the slip rate of the tire on the ground.

In this case, the optimization operation may utilize the following parametric expression:

$$Mu3D = (D^* \sin(C^* a \tan(B^* X1 - E^* (B^* X1 - a \tan(B^* X1))))) + Sv,$$

where, D, B and X1 themselves correspond to the following parametric expressions:

$$D = D0 + D1^* V + D2^* V^2,$$

$$B = B0 + B1^* V + B2^* V^2,$$

$$X1 = (g\%/100) + Sh,$$

and where V is the relative displacement instantaneous speed of the tire axis with regard to the reference surface, and where g % is the slip rate of this tire with regard to this surface, defined by:

$$g\% = 100^*(V - Vp)/V,$$

Vp being the tire peripheral speed.

Furthermore, the braking sequence selected in order to define the integration domain of the instantaneous speed and the slip rate preferably includes a modulation of the braking torque of the type encountered on a vehicle provided with an anti-lock braking system, commonly designated by ABS.

DETAILED DESCRIPTION OF THE DRAWINGS

As stated above, the invention relates to a method for estimating, during a braking situation, the performance of a tire PN to be provided on a vehicle.

Figure 1:
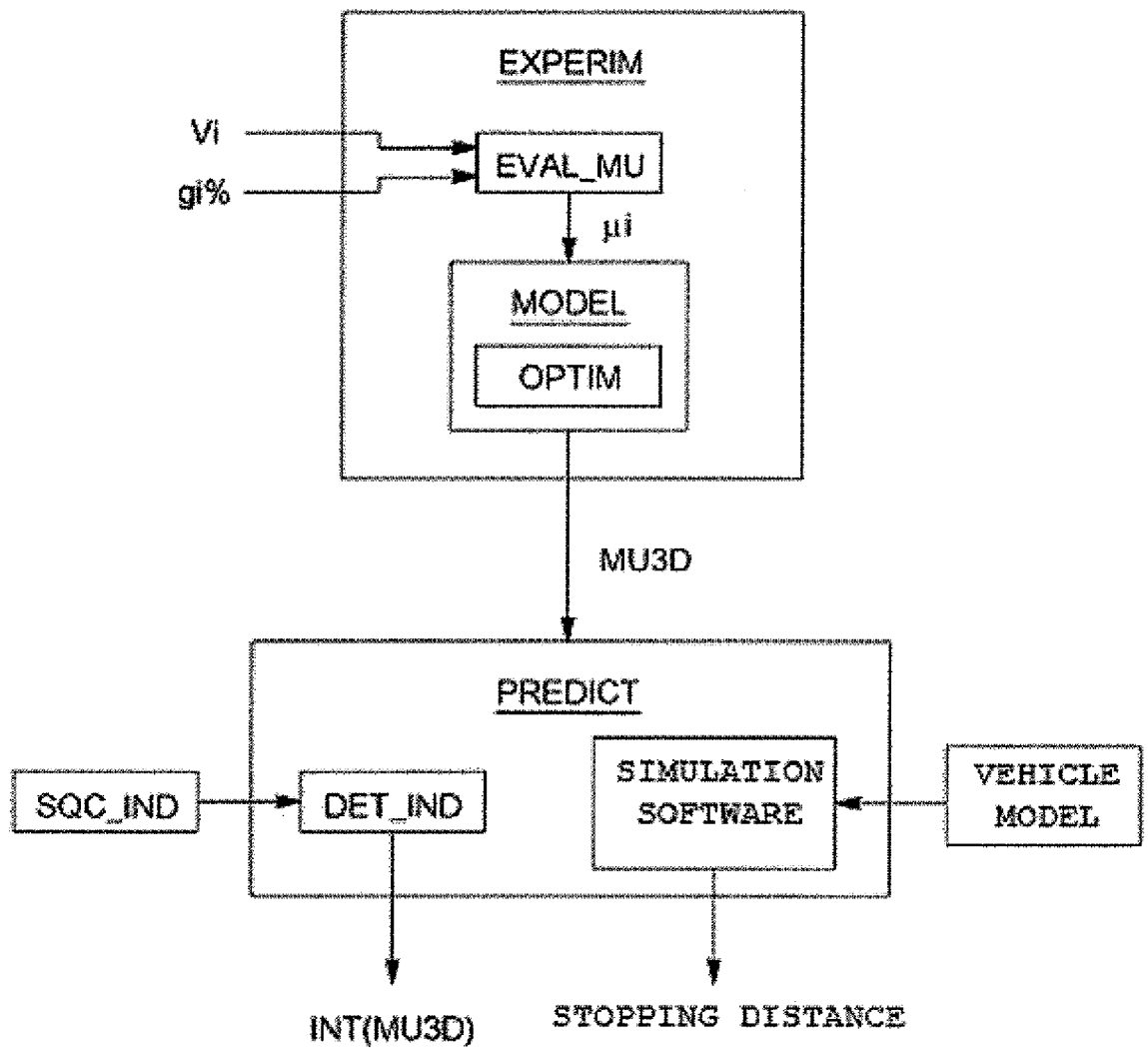
FIG. 1 is an operational organizational diagram of a method in accordance with one embodiment of the invention.

Classically, such a method comprises an experimental phase EXPERIM (FIG. 1) a step EVAL_MU of which is dedicated to the assessment of the ground-tire grip coefficient $\mu$.

As a reminder, the ground-tire grip coefficient $\mu$ is represented, and thus assessed, by the ratio Fx/Fz, where Fx is the longitudinal braking stress corresponding to a braking torque applied by the tire between its axis and the ground, and where Fz is the tire load, that is, the pressing force it imparts to the ground.

According to a first aspect of the invention, the assessment step EVAL_MU is performed for different values, denoted by Vi, of the relative displacement speed V of the tire axis X with regard to the ground, and for different values, denoted by gi %, of the slip rate g % of the tire on the ground, so as to obtain as many values, denoted by $\mu$i, of the grip coefficient $\mu$.

As a reminder, the slip rate g % of a tire is defined by:

$$g \% = 100 * (V - Vp)/V,$$

where V is the tire peripheral speed.

Figure 2:
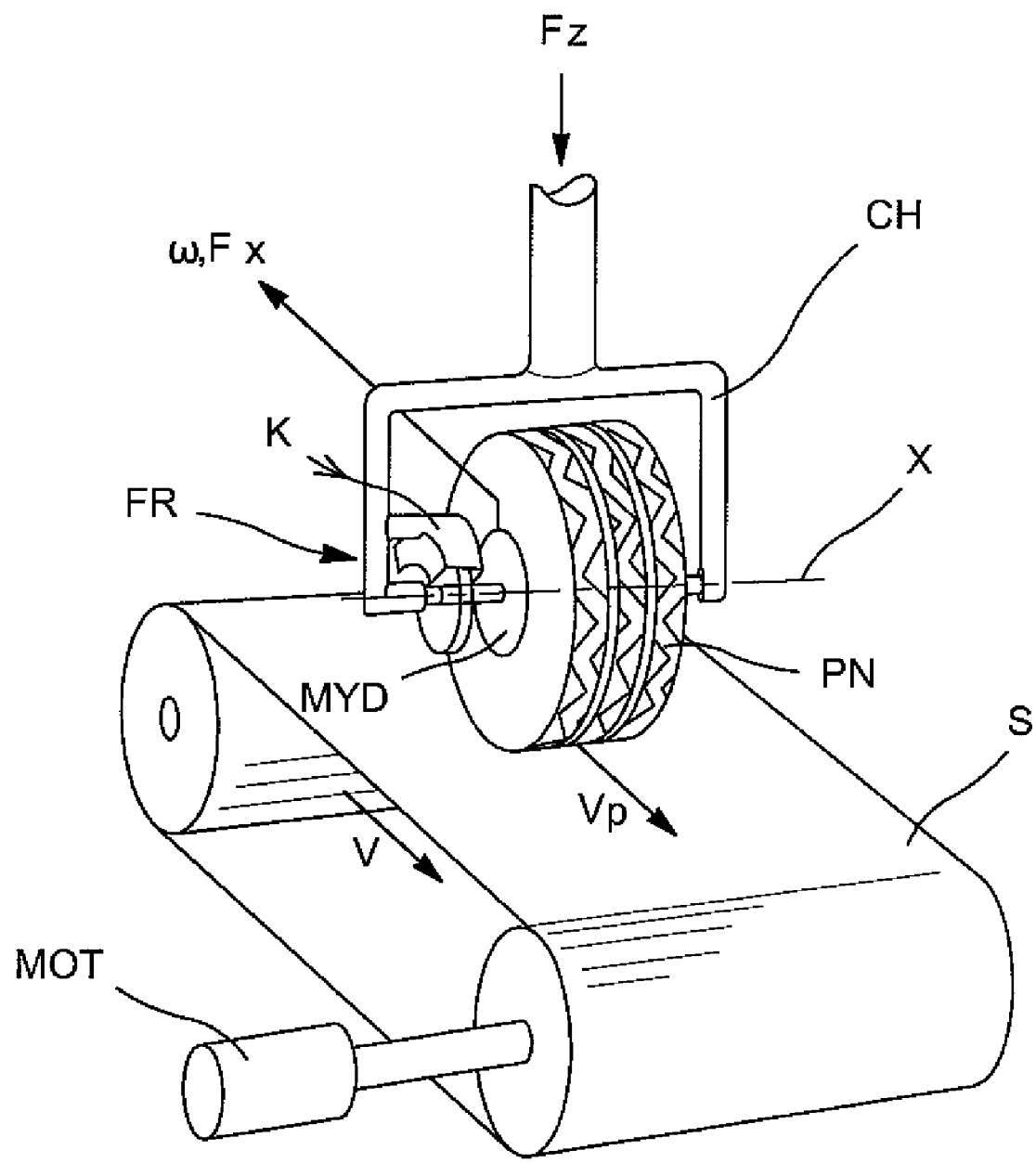
FIG. 2 is a schematic perspective view of an installation for implementing the method in accordance with an embodiment of the invention.

FIG. 2 illustrates, very schematically, an installation that may be used, in a non limitative way, for implementing the assessment step EVAL_MU.

In the illustrated example, this installation comprises an endless strip stretched between two rollers one of which is rotationally driven by a motor MOT, the endless strip being coated with an adherent material allowing it to simulate the ground S of a dry running lane, or a wet lane depending on the desired result.

The tire PN, to be characterized, is inflated to a preset operating pressure and mounted over a tread CH which applies it on the reference surface S of the endless strip with a preset pressing force Fz.

For example, tire PN is mounted on a dynamometric hub MYD and/or rotationally coupled to a coding wheel (not shown), this equipment making it possible to obtain, besides quantities Fz and V, a signal representative of the instantaneous angular rotational speed u of tire PN around axis X thereof, and a signal representative of the longitudinal force Fx corresponding to a braking torque K applied on tire EN by means of a brake FR of which motor is connected to tread CH.

As known by a man skilled in the art, the peripheral speed Vp of the tire, also called tangential speed, is linked to the rotational angular speed $\omega$ through the actual rolling radius $R_{eff}$, this radius may be obtained, for example, as being equal to the value taken by ratio V/$\omega$ during the braking-free rolling stages.

Tire PN is arranged parallel to the median axis of the endless strip and perpendicular to the reference surface S, that is, with null drift angle and camber angle.

This installation, advantageously located in a substantially constant temperature room, make it possible to drive the variables composed, on one hand, by the running speed of the reference surface S with regard to the stationary axis X of tire PN, and on the other hand, the slip rate g %.

By definition, the slip ratio takes value 0% when Vp=V, that is when tire PN is in a pure running situation on surface S, and value 100% when Vp=0, that is, when the wheel equipped with tire PN is completely blocked by the braking operation.

After a step of warming up the tire PN through its rolling at an initial speed, the assessment step EVAL_MU is continued by a braking cycle, during which a braking torque K is periodically applied on tire PN for a decreasing running speed V of the reference surface S, and while the instantaneous variables V, $\omega$, Fz and Fx are picked up.

Figure 3:
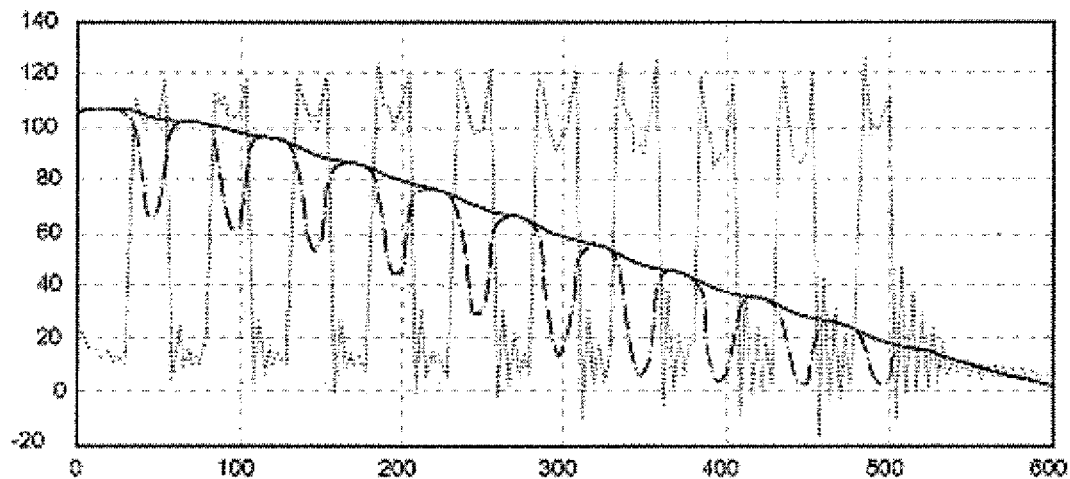
FIG. 3 is a diagram representing on the ordinate, as a function of time, measured for example in hundredth of second and taken on the abscise, a hundredfold the value of the grip coefficient (stippled curve), the peripheral speed of the tire (chain dotted line curve) and the instantaneous displacement speed of the tire axis with regard to the reference surface (solid line curve), in an embodiment of the method of the invention.

This step makes it possible to obtain curves such as those illustrated on FIG. 3, wherein the stippled curve represents a hundredfold the value of the grip coefficient $\mu$, the chain dotted line curve represents the peripheral speed Vp of the tire, and the solid line curve represents the relative displacement instantaneous speed of axis X of the tire with regard to the reference surface S.

This FIG. 3 illustrates a braking sequence SQC_FR relevant for characterizing a tire in a braking situation on a present vehicle, that is, a sequence of the type generated by an ABS-type braking system, that is, an anti-lock braking system, during a braking test from 100 Km/h to 0 Km/h.

In such a sequence, speed V decreases monotonously, ideally, linearly, from a maximal speed V0 to a minimal speed, preferably null, within a parameterizable time period comprised between 3 and 6 seconds.

Within this time period, it is possible to perform 5 to 10 cycles of varying the slip rate g % between a null value and a maximal value g % max, which may be parameterized, for example, between 20% and 100%.

In these conditions, the aforementioned parameter g % max is selected such that it reaches and slightly exceeds the slip rate value for which the longitudinal braking stress Fx is at its maximum.

According to a second aspect of the invention, the experimental phase EXPERIM comprises a modelization step MODEL of representing the grip coefficient $\mu$ of this tire, such as it appears from its various values $\mu$i obtained during the assessment step EVAL_MU, by a function, denoted MU3D, of speed V and slip rate g %.

To this end, the modelization step MODEL preferably comprises an optimization operation OPTIM of seeking the values to be allocated to predetermined parameters such that a parametric expression of the aforementioned function MU3D corresponds at best to the grip coefficient $\mu$ as it has been assessed during the assessment step EVAL_MU.

For example, the parametric expression of function MU3D may take the following form:

$$Mu3D = (D * \sin(C * a\tan(B * X1 - E * (B * X1 - a\tan(B * X1))))) + Sv,$$

where D, B and X1 themselves correspond to the following parametric expressions:

$$D=D0+D1*V+D2*V^2,$$

$$B=B0+B1*V+B2*V^2,$$

$$X1=(g\%/100)+Sh,$$

where Sv is for example equal to 0.01 and where Sh may be zero.

Thus, the optimization operation OPTIM, which may use any known optimization tool, consists in seeking the values to be allocated to at least parameters B0, B1, B2, C, D0, D1, D2 and E, such that the parametric expression MU3D above takes, for an as large as necessary set of different values Vi of speed V and of different values gi % of slip rate g %, respective values that are as close as possible to the corresponding values µi that have been picked up for the grip coefficient µduring the assessment step EVAL_MU.

In practice, it may be desirable to perform, prior to operation OPTIM, a filtering operation on the measurement signals such as ω, V, Fz and Fx to avoid artefacts related to measurement noises.

Figure 4:
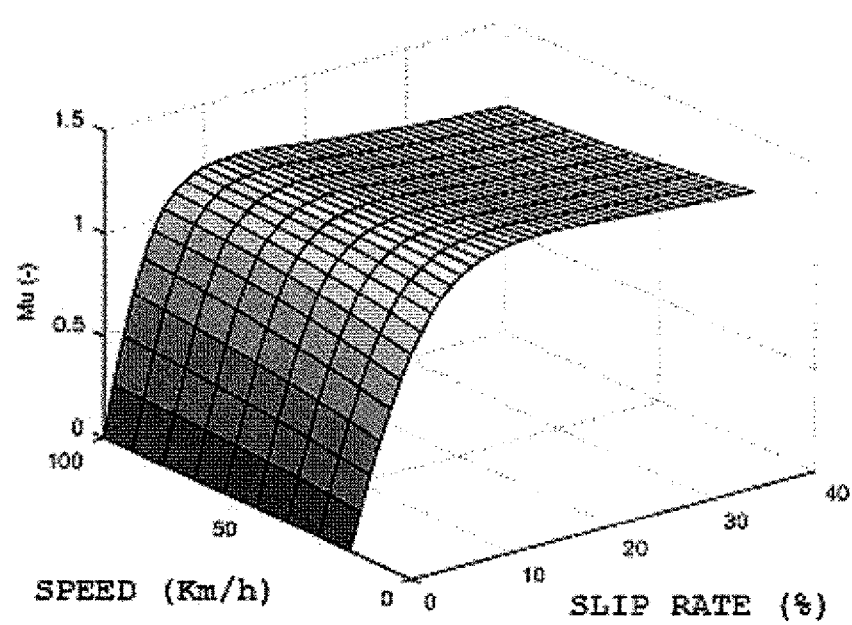
FIG. 4 is a diagram illustrating a representation, in accordance with an embodiment of the invention, of a grip coefficient as a function of a speed and a slip rate.

Once the values of parameters B0, B1, B2, C, D0, D1, D2, E, Sh and Sv, determined, function MU3D representative of the grip coefficient µ may be drawn in a three-dimensional space such as illustrated on FIG. 4 and a first dimension of which corresponds to the slip rate g %, a second dimension of which corresponds to speed V, and a third dimension of which corresponds to the modelized value of the grip coefficient µ.

Although such a diagram constitutes per se a tool for estimating the performance of a tire PN during a braking situation, the method of the invention may further comprise a predictive phase PREDICT making it possible to obtain a more elaborated wrap-up of the tire performance.

To this end, this predictive phase may notably include an operation DET_IND allowing for the determination of an overall tire performance indicator INT(MU3D).

For example, this operation DET_IND, consists in providing, as a performance indicator, the integral, against the instantaneous speed V and against the slip rate g %, of function MU3D over an integration domain formed by instantaneous speeds and slip rates corresponding to a real or simulated braking sequence SQC_FR of a vehicle equipped with the corresponding tire PN.

Preferably, the braking sequence SQC_FR selected in order to define the integration domain of the instantaneous speed V and slip rate g % includes a modulation of the braking torque K of the type performed by a braking system provided with an anti lock braking function, also called ABS.

Typically, for a braking operation from 100 Km/h to the complete immobilization of the vehicle, this indicator INT (MU3D) will thus be constituted by the integral of function MU3D, calculated between 0 and 100 Km/h for variable V, and between 5% and 15% for variable g %.

By incorporating function MU3D to the dynamic model of a vehicle, it is also possible to predict the braking distance of the modelized vehicle, provided with tires exhibiting a grip coefficient modelized by function MU3D, and applying a braking sequence SQC_FR be obtained from real measurements or corresponding to a synthesized signal, or generated by a braking model of the ABS type, that is, provided with an anti lock braking function.

The invention claimed is:

1. A method for estimating, during a braking situation, the performance of a tire to be provided to a vehicle, the method comprising:
    an experimental phase including:
        a step of assessing the grip coefficient of the tire on the ground, performed for different values of the relative displacement speed of the tire axis with regard to the ground and for different values of the tire slip rate on the ground, and
        a modelization step of representing the grip coefficient of said tire, as resulting from the assessment step, by a function of the relative displacement speed of axis of said tire with regard to the ground and of the slip rate of said tire on the ground; and
    a predictive phase including an operation of determining an overall indicator of the tire performance, which comprises integrating, against the relative displacement instantaneous speed of axis of the tire and of the ground, and against the slip rate of said tire on the ground, the function representative of the tire grip coefficient, over a domain of instantaneous speeds and slip rates corresponding to a real or simulated braking sequence.

2. The method according to claim 1, wherein said step of assessing the grip coefficient of the tire comprises the simultaneous operations of:
    rolling said tire on a reference surface equivalent to the ground;
    applying said tire on the reference surface with a pressing force the intensity of which is known by adjustment and/or measurement;
    running, with regard to the tire axis, the reference surface at a relative displacement instantaneous speed, known by adjustment and/or measurement, and decreasing from a maximal value to a minimal value;
    measuring the instantaneous angular rotational speed of said tire; and
    periodically applying on said tire a braking torque of an instantaneous value known by adjustment and/or measurement and able to cause a slippage of said tire on the reference surface.

3. The method according to claim 2, wherein the grip coefficient is assessed by ratio, of the longitudinal force, corresponding to braking torque, to the pressing force.

4. The method according to claim 2, wherein the operation of periodically applying the braking torque is controlled so as to vary the slip rate of the tire with regard to the reference surface between a preferably null minimal value and a maximal value at least equal to 20%.

5. The method according to claim 3, wherein the operation of periodically applying the braking torque is controlled so as to periodically reach the value of slip rate for which the grip value is at its maximum.

6. The method according to claim 1, wherein the step of assessing the tire grip coefficient is implemented in a substantially constant temperature room.

7. The method according to claim 1, wherein the modelization step comprises an optimization operation of seeking the values to be allocated to predetermined parameters such that a parametric expression of said function of the relative displacement speed of the axis of the tire with regard to the ground and of the slip rate of said tire on the ground correspond at best to the grip coefficient as assessed, during the assessment step, for the different values of the relative displacement speed of the axis of the tire with regard to the ground and for the different values of the slip rate of the tire on the ground.

8. The method according to claim 7, wherein the optimization operation uses the following parametric expression:

$$Mu3D = (D * \sin(C * a\tan(B*X1 - E*(B*X1 - a\tan(B*X1))))) + Sv,$$

where D, B et X1 themselves correspond to the following parametric expressions:
$D = D0 + D1*V + D2*V^2$,
$B = B0 + B1*V + B2*V^2$,
$X1 = (g\%/100) + Sh$,
and where V is the relative displacement instantaneous speed of the axis of said tire with regard to the reference surface, and where is the slip rate (g %) of said tire with regard to this surface, is defined by:

$$g\% = 100*(V - Vp)/V,$$

Vp being the peripheral speed of the tire.

9. The method according to claim 1, wherein the braking sequence selected so as to define the integration domain of the instantaneous speed and slip rate includes a modulation of the braking torque of the type encountered on a vehicle provided with an anti lock braking system or "ABS".

* * * * *